US012090485B2

(12) United States Patent
De Haas et al.

(10) Patent No.: US 12,090,485 B2
(45) Date of Patent: Sep. 17, 2024

(54) HOLDER FOR A MICROFLUIDIC CHIP

(71) Applicant: INTERFACE FLUIDICS LTD., Calgary (CA)

(72) Inventors: Thomas De Haas, Edmonton (CA); Stuart De Haas, Victoria (CA); Emma Serediak, Andrew (CA)

(73) Assignee: INTERFACE FLUIDICS LTD., Calgary (CA)

( * ) Notice: Subject to any disclaimer, the term of this patent is extended or adjusted under 35 U.S.C. 154(b) by 607 days.

(21) Appl. No.: 17/377,798

(22) Filed: Jul. 16, 2021

(65) Prior Publication Data

US 2021/0339258 A1 Nov. 4, 2021

Related U.S. Application Data

(63) Continuation of application No. 17/267,088, filed as application No. PCT/CA2019/051114 on Aug. 16, 2019.

(60) Provisional application No. 62/721,719, filed on Aug. 23, 2018.

(51) Int. Cl.
*B01L 9/00* (2006.01)
*B01L 3/00* (2006.01)

(52) U.S. Cl.
CPC ......... *B01L 9/527* (2013.01); *B01L 3/502715* (2013.01); *B01L 2200/027* (2013.01); *B01L 2300/0816* (2013.01)

(58) Field of Classification Search
CPC ...... B01L 9/527; B01L 2200/027; B01L 9/00; B01L 3/00; B01L 2300/0816; B01L 3/502715
See application file for complete search history.

(56) References Cited

U.S. PATENT DOCUMENTS

| | | | |
|---|---|---|---|
| 9,488,586 | B2 | 11/2016 | He et al. |
| 10,001,435 | B1 | 6/2018 | Sinton et al. |
| 10,801,628 | B2 | 10/2020 | Forrest et al. |

(Continued)

FOREIGN PATENT DOCUMENTS

| | | |
|---|---|---|
| CN | 204448038 U | 7/2015 |
| CN | 107703036 B | 6/2020 |

(Continued)

OTHER PUBLICATIONS

Dolomite Resealable Chip Interface Data Sheet, https://www.dolomite-microfluidics.com/product/resealable-chip-interface/.

(Continued)

*Primary Examiner* — Brian J. Sines
(74) *Attorney, Agent, or Firm* — ABM Intellectual Property Inc.; Adrienne Bieber McNeil

(57) ABSTRACT

A microfluidic chip and holder assembly includes a base having a seat and at least a first fluid channel that extends through the base. The first fluid channel has an inlet that is spaced from the seat for connection to a fluid supply and an outlet that is in the seat. A microfluidic chip is received by the seat, and the microfluidic chip has a fluid pathway. A cover is mounted over the microfluidic chip to sandwich the microfluidic chip between the cover and the base. The cover bears against the microfluidic chip to force the microfluidic chip to bear against the base and form a sealed connection between the outlet of the fluid channel and the fluid pathway of the microfluidic chip.

20 Claims, 8 Drawing Sheets

(56) References Cited

U.S. PATENT DOCUMENTS

| | | | |
|---|---|---|---|
| 2006/0063160 | A1 | 3/2006 | West et al. |
| 2010/0320748 | A1 | 12/2010 | Oever et al. |

FOREIGN PATENT DOCUMENTS

| | | | |
|---|---|---|---|
| EP | 3235568 | A1 | 10/2017 |
| WO | 2000078456 | A1 | 12/2000 |

OTHER PUBLICATIONS

International Search Report & Written Opinion of the International Searching Authority in parent International Patent Application No. PCT/CA2019/051114, mailed Oct. 18, 2019.
Micronit Microfluidics, Fluid Connect 4515, User Manual.
Samuel Marre, Andrea Adamo, Soubir Basak, Cyril Aymonier, and Klavs F. Jensen; “Design and Packaging of Microreactors for High Pressure and High Temperature Applications”; Ind. Eng. Chem. Res. 2010, 49, 11310-11320.
Shih-Chuan Liao, Jing Peng, Michael G. Mauk, Sita Awasthi, Jinzhao Song, Harvey Friedman, Haim H. Bau, and Changchun Liua, “Smart Cup: A minimally-Instrumented, Smartphone-Based Point-of-Care Molecular Diagnostic Device” Sens Actuators B Chem. Jun. 28, 2016; 229:232-238.
Xiang Cheng, Matthew D. Ooms, and David Sinton; “Biomass-to-biocrude on a chip via hydrothermal liquefaction of algae”; Lab Chip, 2016, 16, 256-260.
https://gobiond.com/products/.

HOLDER FOR A MICROFLUIDIC CHIP

CROSS-REFERENCES TO RELATED APPLICATIONS

This application is a continuation of U.S. patent application Ser. No. 17/267,088 filed on Feb. 9, 2021, which is a national stage entry of international patent application no. PCT/CA2019/051114 filed on Aug. 16, 2019, which claims the benefit of and/or priority from U.S. Provisional Patent Application No. 62/721,719, filed on Aug. 23, 2018, all of which are incorporated herein by reference in their entirety.

FIELD

This document relates to microfluidics. More specifically, this document relates to a kit of parts for a holder for a microfluidic chip, a microfluidic chip and holder assembly, and a method for assembling a microfluidic chip and a holder.

BACKGROUND

US Patent Application Publication No. 2010/0320748 (van't Oever) discloses a system for fluidic coupling and uncoupling of fluidic conduits and a microfluidic chip, wherein the fluidic conduits are connected mechanically to a first structural part and the microfluidic chip is carried by a second structural part. The structural parts are moved perpendicularly toward and away from each other by means of a mechanism provided for this purpose. Outer ends of the fluidic conduits can thus be moved over a determined distance substantially perpendicularly to the outer surface of the microfluidic chip and connecting openings in the outer surface of the microfluidic chip.

SUMMARY

The following summary is intended to introduce the reader to various aspects of the detailed description, but not to define or delimit any invention.

According to some aspects, a kit of parts for a holder for a microfluidic chip includes a base having an outward facing surface a first circular wall. The outward facing surface has a seat for receiving a microfluidic chip, and the first circular wall extends around the seat and has a first screw thread. A cover is mountable to the base over the seat for retaining the microfluidic chip on the seat. The cover has a window and a second circular wall extending around the window. The second circular wall has second screw thread. The second screw thread is engageable with the first screw thread to screw the cover to the base with the window overlying the seat.

In some examples, the cover includes a ring, and the ring includes the second circular wall and the window. The ring can include an annular flange defining the window, and the second circular wall can extend orthogonally from the annular flange.

In some examples, the cover further includes a compression guide positionable between the annular flange and the base. The compression guide can include a disc having an opening therethrough. The compression guide can include at least one through hole, the base can include at least one aperture alignable with the through hole, and the cover can include at least one pin receivable in the through hole and the aperture. When a microfluidic chip is received on the seat and the cover is screwed to the base, the compression guide can bear against the microfluidic chip.

In some examples, the cover further includes a transparent panel positionable over the seat. The panel can include, for example, a glass panel, a sapphire panel, a quartz panel, or a plastic panel. When the cover is screwed to the base, the window can overlie the panel and the annular flange can bear against the panel, for example against a periphery of the panel. The annular flange can in some examples bear against the panel indirectly.

In some examples, the cover further includes an annular gasket positionable between the annular flange and the panel.

In some examples, the cover further includes a compression guide positionable between the annular flange and the panel. The compression guide can include a disc having an opening therethrough. The compression guide can include at least one through hole, the base can include at least one aperture alignable with the through hole, and the cover can include at least one pin receivable in the through hole and the aperture.

In some examples, when a microfluidic chip is received on the seat and the cover is screwed to the base, the panel bears against the microfluidic chip.

In some examples, the first screw thread is on an outer surface of the first circular wall, the second screw thread is on an inner surface of the second circular wall, and the first circular wall is nestable within the second circular wall.

In some examples, the first circular wall has an end surface, and the outward facing surface is recessed from the end surface to define a pocket adjacent the outward facing surface within the first circular wall. The panel can be receivable in the pocket.

In some examples, at least a first fluid inflow channel extends through the base. The first fluid inflow channel can have an inflow channel outlet in the seat, and an inflow channel inlet spaced from the seat. The seat can include a first o-ring, which can surround the inflow channel outlet. When a microfluidic chip is received on the seat and the cover is screwed to the base, the microfluidic chip can bear against the first o-ring.

In some examples, at least a first fluid outflow channel extends through the base. The first fluid outflow channel can have an outflow channel inlet in the seat, and an outflow channel outlet spaced from the seat. The seat can include a second o-ring, which can surround the outflow channel inlet. When a microfluidic chip is received on the seat and the cover is screwed to the base, the microfluidic chip can bear against the second o-ring.

In some examples, the kit further includes a torque wrench for tightening the cover and the base. The cover can include a connector for engaging with the torque wrench.

In some examples, the base is fabricated from titanium.

According to some aspects, a microfluidic chip and holder assembly includes a microfluidic chip, a base, and a cover. The base has an outward facing surface and a first circular wall. The outward facing surface has a seat, and the first circular wall extends around the seat. The microfluidic chip is received on the seat. The cover is mounted to the base over the microfluidic chip and secures the microfluidic chip on the seat. The cover has a window aligned with the microfluidic chip, and a second circular wall extending around the window and screwed together with the first circular wall.

In some examples, the cover bears against the microfluidic chip, and the microfluidic chip bears against the base. The microfluidic chip can have a cover-facing surface, and the cover can bear against a majority of the cover-facing surface or an entirety of the cover-facing surface.

In some examples, the cover includes a ring and the ring includes the second circular wall and the window. In some examples, the ring includes an annular flange defining the window, and the second circular wall extends orthogonally from the annular flange. In some examples, the cover further includes a compression guide positioned between the annular flange and the base. The compression guide can include a disc having an opening therethrough. The compression guide can include at least one through hole, the base can include at least one aperture aligned with the through hole, and the cover can include at least one pin received in the through hole and the aperture. The annular flange can bear against the compression guide, and the compression guide can bear against the microfluidic chip.

In some examples, the cover further includes a transparent panel covering the microfluidic chip and bearing against the microfluidic chip. The panel can include a glass panel, a sapphire panel, a quartz panel, or a plastic panel. The annular flange can bear against the panel, for example against a periphery of the panel. The annular flange can in some examples bear against the panel indirectly.

In some examples, the assembly further includes an annular gasket between the annular flange and the periphery of the panel.

In some examples, the cover further includes a compression guide positioned between the annular flange and the panel. The compression guide can include a disc having an opening therethrough. The compression guide can include at least one through hole, the base can include at least one aperture aligned with the through hole, and the cover can include at least one pin received in the through hole and the aperture.

In some examples, the first circular wall includes an outer surface having a first screw thread, the second circular wall includes an inner surface having a second screw thread, and the first circular wall is nested within the second circular wall and the first screw thread is engaged with the second screw thread.

In some examples, the first circular wall has an end surface, and the outward facing surface is recessed from the end surface to define a pocket adjacent the outward facing surface within the first circular wall. The panel can be received in the pocket.

In some examples, at least a first fluid inflow channel extends through the base. The first fluid inflow channel can have an inflow channel outlet in the seat and in communication with a fluid pathway of the microfluidic chip, and an inflow channel inlet spaced from the seat. The seat can include a first o-ring, which can surround the inflow channel outlet. The microfluidic chip can bear against the first o-ring.

In some examples, at least a first fluid outflow channel extends through the base. The first fluid outflow channel can have an outflow channel inlet in the seat and in communication with the fluid pathway of the microfluidic chip, and an outflow channel outlet spaced from the seat. The seat can include a second o-ring, which can surround the outflow channel inlet. The microfluidic chip can bear against the second o-ring.

In some examples, the base is fabricated from titanium.

According to some aspects, a method for assembling a microfluidic chip and a holder includes a. seating a microfluidic chip on a seat of a base; b. mounting a cover to the base over the microfluidic chip, with a window of the cover aligned with the microfluidic chip; and c. screwing the cover to the base by rotating at least a portion of cover with respect to the base.

In some examples, step b. includes positioning a compression guide of the cover over the microfluidic chip. Step b. can include positioning a ring of the cover over the compression guide. Step b. can include positioning an annular flange of the ring over the compression guide. Step c. can include rotating the ring. In step c., the annular flange can bear against the compression guide. During step c., the compression guide can be prevented from rotating.

In some examples, step b. includes positioning a transparent panel of the cover over the microfluidic chip. In some examples, step b. includes positioning a ring of the cover over the transparent panel. In some examples, step b. includes positioning an annular flange of the ring over the panel. In some examples, step c. includes comprises rotating the ring. In some examples, in step c., the annular flange bears against the panel. In some examples, the method further includes positioning an annular gasket between the ring and the panel. In some examples, the method further includes positioning a compression guide between the ring and the panel. During step c., the compression guide can be prevented from rotating.

In some examples, in step c., the cover is forced to bear against the microfluidic chip. The cover can be forced to bear against a majority of a cover-facing surface of the microfluidic chip.

In some examples, step b. includes nesting the panel in a pocket of the base.

In some examples, the method further includes, after step c., flowing a fluid into a fluid port of the microfluidic chip at a pressure of at least 320 bar. The fluid can flow into the fluid port of the microfluidic chip via a fluid inflow channel in the base.

According to some aspects, a microfluidic chip and holder assembly includes a base having a seat and at least a first fluid channel that extends through the base. The first fluid channel has an inlet that is spaced from the seat for connection to a fluid supply and an outlet that is in the seat. A microfluidic chip received by the seat, and the microfluidic chip has a fluid pathway; A cover is mounted over the microfluidic chip to sandwich the microfluidic chip between the cover and the base. The cover bears against the microfluidic chip to force the microfluidic chip to bear against the base and form a sealed connection between the outlet of the fluid channel and the fluid pathway of the microfluidic chip.

In some examples, the base includes an o-ring that surrounds the outlet, and the microfluidic chip bears against the o-ring to form the sealed connection.

In some examples, the microfluidic chip includes a base-facing surface and a cover-facing surface, and the cover bears against a majority of the cover-facing surface.

In some examples, the cover includes a window that overlies the microfluidic chip to allow analytical access to the microfluidic chip. The cover can include a transparent panel that bears against the microfluidic chip, and the window can overlie the panel.

In some examples, the cover is mounted over the microfluidic chip by screwing the cover to the base.

In some examples, the base includes a space below the seat, and a heating/cooling apparatus is received in the space.

According to some aspects, a kit of parts for a holder for a microfluidic chip includes a base and a cover. The base has a seat against which a microfluidic chip is seatable, and at least a first fluid channel that extends through the base. The first fluid channel has an inlet that is spaced from the seat for connection to a fluid supply, and an outlet that is in the seat for connection to a fluid pathway of the microfluidic chip. The cover is mountable over the seat. The cover is configured to bear against the microfluidic chip when the microfluidic chip is seated against the seat to force the microfluidic chip to bear against the base and form a sealed connection between the outlet of the fluid channel and a fluid pathway of the microfluidic chip.

In some examples, the base includes an o-ring that surrounds the outlet to form the sealed connection.

In some examples, the cover is configured to bear against a majority of a cover-facing surface of the microfluidic chip.

In some examples, the cover includes a window that overlies the seat. The cover can include a transparent panel that is configured to bear against the microfluidic chip, and the window overlies the panel.

In some examples, the cover is mountable over the seat by screwing the cover to the base.

In some examples, the base includes a space below the seat, and a heating/cooling apparatus is received in the space.

According to some aspects, a method for assembling a microfluidic chip and a holder includes: a. seating a microfluidic chip against a seat of a base; b. forcing a cover against the microfluidic chip to sandwich the microfluidic chip between the base and the cover and thereby seal a fluid connection between the base and the microfluidic chip; and c. flowing a fluid into the microfluidic chip via a fluid channel of the base.

In some examples, step c. includes flowing the fluid into the microfluidic chip at a pressure of at least 320 bar.

In some examples, step b. includes forcing the cover against the microfluidic chip to force the microfluidic chip to bear against an o-ring of the base.

In some examples, step b. includes forcing the cover to bear against a majority of a cover-facing surface of the microfluidic chip.

In some examples, step b. includes screwing the cover to the base.

In some examples, the method further includes: d. accessing the microfluidic chip through a viewing window to analyze the flow of the fluid.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by this document. Any subject matter described below and for which an exclusive right is not granted by this document may be the subject matter of another protective instrument, for example, a continuing patent application, and the applicants, inventors or owners do not intend to abandon, disclaim or dedicate to the public any such subject matter by its disclosure in this document.

Generally disclosed herein is a holder for a microfluidic chip, and related methods, assemblies, and kits of parts. The holder can in some examples allow for assembly of a microfluidic chip and the holder with relative ease, can reduce or minimize or prevent cracking and breaking of microfluidic chips in use, and be used under relatively high-pressure conditions (e.g. with fluids pressurized to greater than 320 bar). The holder can be used in various types of microfluidic processes and to hold various types of microfluidic chips, but may be particularly useful in microfluidic research involving the modelling of subterranean formations (e.g. oil-bearing shale formations), which can require that high-pressure conditions be created in a microfluidic chip.

Figure 1:
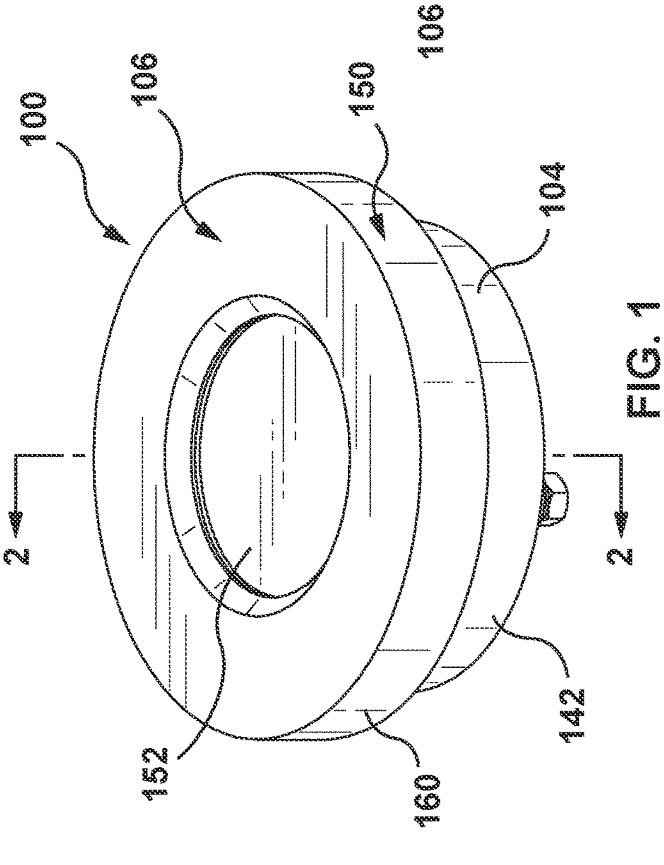
FIG. 1 is a perspective view of an example holder for a microfluidic chip, assembled together with a microfluidic chip.
Figure 2:
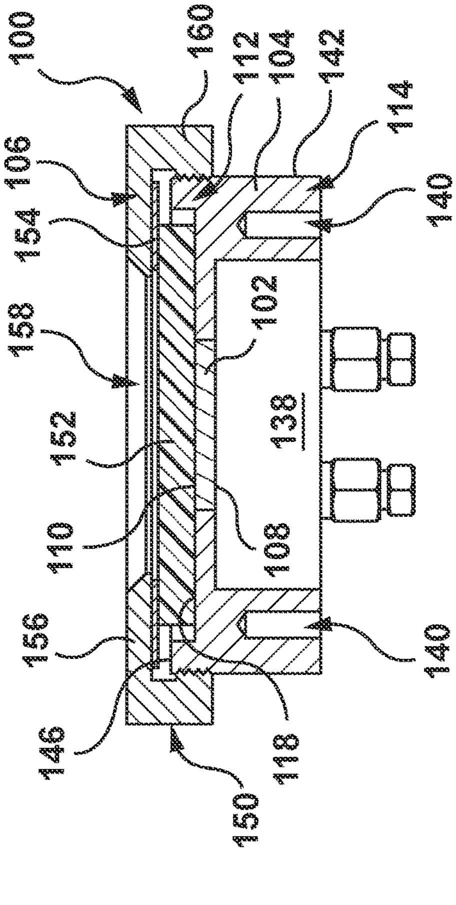
FIG. 2 is a cross-section taken along line 2-2 in FIG. 1.
Figure 3:
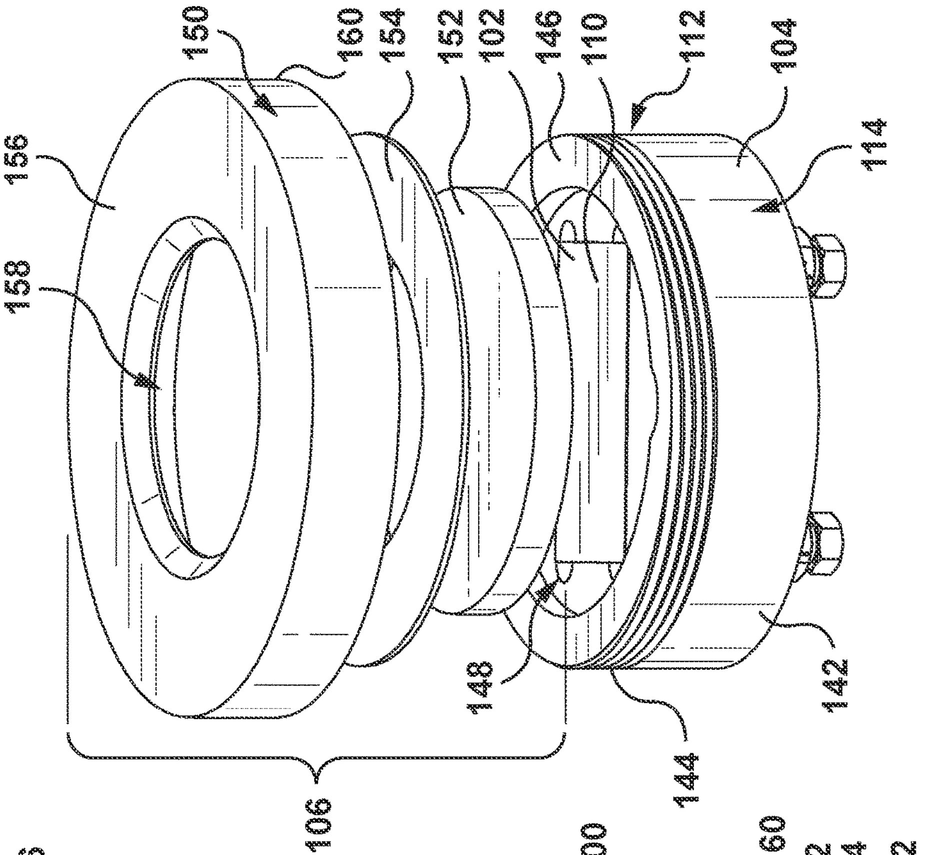
FIG. 3 is an exploded view of the holder and microfluidic chip of FIG. 1.

Referring now to FIGS. 1 to 3, a first example of a holder 100 for a microfluidic chip 102 is shown. The holder 100 generally includes a base 104 and a cover 106. In the example shown, the holder 100 is used with the base 104 on the bottom and the cover 106 on top; however, in alternative examples, the holder 100 can be inverted so that the base 104 is on top of the cover 106. In use, in the example shown, the microfluidic chip 102 is sandwiched between the base 104 and the cover 106, so that the cover 106 bears against the microfluidic chip 102 which in turn bears against the base 104. The base 104 provides for fluid flow to and from the microfluidic chip 102 (optionally at high pressure), while the cover 106 allows for analytical access (e.g. optical access, in order to carry out an optical investigation) to the microfluidic chip 102.

For simplicity, microfluidic chips are not described in detail herein. However, in this document, the surface of the microfluidic chip 102 that in use faces towards the base 104 will be referred to as a "base-facing surface 108" of the microfluidic chip 102, and the surface of the microfluidic chip 102 that in use faces towards the cover 106 will be referred to as a "cover-facing surface 110" of the microfluidic chip 102.

Referring to FIGS. 4 to 7, the base 104 will first be described. In the example shown, the base 104 is generally cylindrical in shape, and includes top 112 and bottom 114 portions that are spaced apart along a longitudinal axis 116 of the base. The top portion 112 includes an outward-facing surface 118 (which in the example shown is upwardly facing) that is generally circular. The outward facing surface 118 has a seat 120 for receiving the microfluidic chip 102 (not shown in FIGS. 4 to 7). In the example shown, the seat 120 is defined by a recess in the outward facing surface 118, in which the microfluidic chip 102 can be nested. In alternative examples, the seat can be of another configuration. For example, the seat can be a non-recessed portion of the outward-facing surface, upon which the microfluidic chip 102 can rest.

Figure 5:
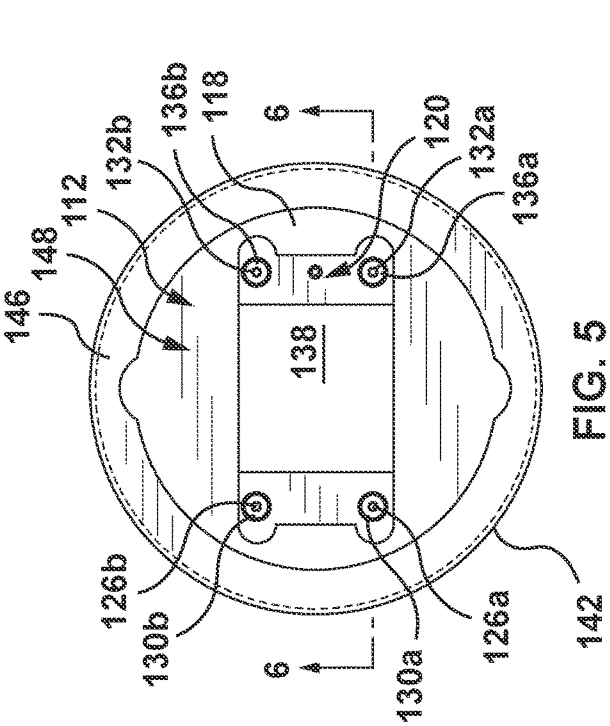
FIG. 5 is a top view of the base of FIG. 4.
Figure 6:
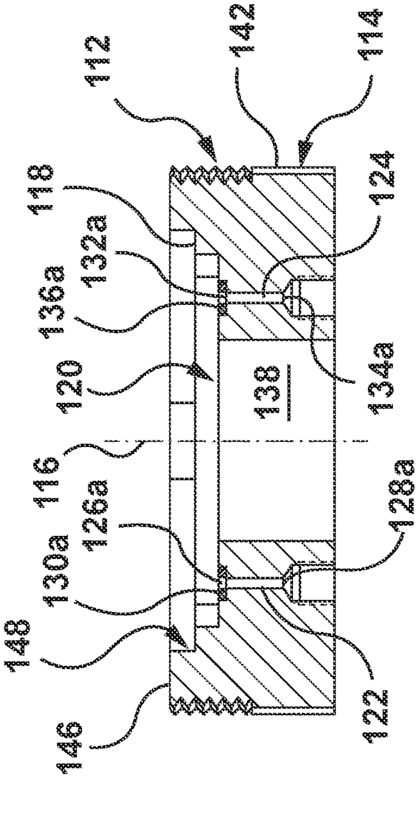
FIG. 6 is a cross section taken along line 6-6 in FIG. 5.

Referring still to FIGS. 4 to 7, in the example shown, the bottom portion 114 of the base 104 includes various flow channels for routing fluids to and from the microfluidic chip 102 on the seat 120. Specifically, as shown in FIG. 6, the bottom portion 114 includes a pair of fluid inflow channels 122 (only one of which is visible in FIG. 6) that extend through the base 104 for supplying fluid to the microfluidic chip 102, and a pair of fluid outflow channels 124 (only one of which is visible in FIG. 6) that extend through the base 104 for directing fluid out of the microfluidic chip 102. The fluid inflow channels 122 each have a respective outlet 126*a*, 126*b* (also referred to herein as an 'inflow channel outlet') in the seat 120 for connection to a fluid port of the microfluidic chip 102, and a respective inlet 128*a*, 128*b* (also referred to herein as an 'inflow channel inlet') that is spaced from the seat 120 and to which a fluid supply line (e.g. in the form of flexible tubing) can be connected. In the example shown, each inflow channel outlet 126*a*, 126*b* is surrounded by a respective o-ring 130*a*, 130*b* of the seat 120. As will be described further below, in use, the microfluidic chip 102 bears against the o-rings 130*a*, 130*b* to form a sealed connection between the inflow channel outlets 126*a*, 126*b* in the base 104 and fluid ports in the base-facing surface 108 of the microfluidic chip 102. Likewise, the fluid outflow channels 124 each have a respective inlet 132*a*, 132*b* (also referred to herein as an 'outflow channel inlet') in the seat 120 for connection to a fluid port of the microfluidic chip 102, and a respective outlet 134*a*, 134*b* (also referred to herein as an 'outflow channel outlet') that is spaced from the seat 120 and to which a fluid return line (e.g. in the form of flexible tubing) can be connected. In the example shown, each outflow channel inlet 132*a*, 132*b* is surrounded by a respective o-ring 136*a*, 136*b* of the seat 120. As will be described further below, in use, the microfluidic chip 102 bears against the o-rings 136*a*, 136*b* to form a sealed connection between the outflow channel inlets 132*a*, 132*b* in the base 104 and fluid ports in the base-facing surface 108 of the microfluidic chip 102.

In alternative examples, the base can include another number of fluid inflow and fluid outflow channels (i.e. at least one fluid inflow channel and at least one fluid outflow channel).

Referring still to FIGS. 4 to 7, in the example shown, the base 104 further includes a space 138 below the seat 120 for receiving a heating or cooling apparatus.

Figure 7:
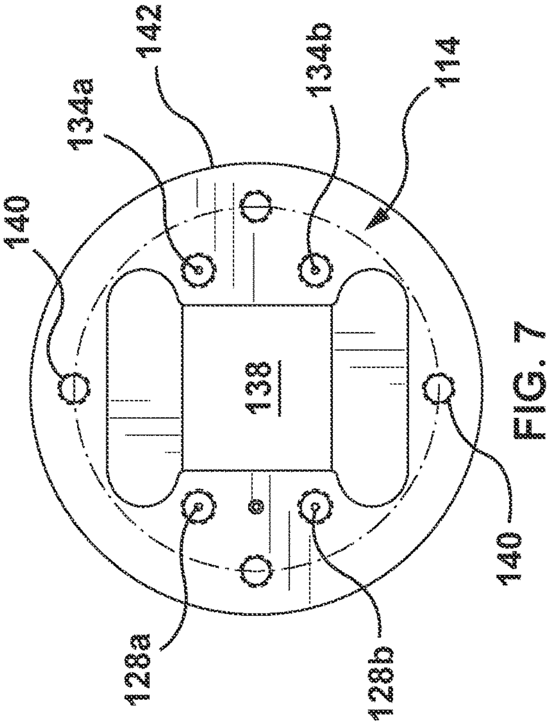
FIG. 7 is a bottom view of the base of FIG. 4.
Figure 4:
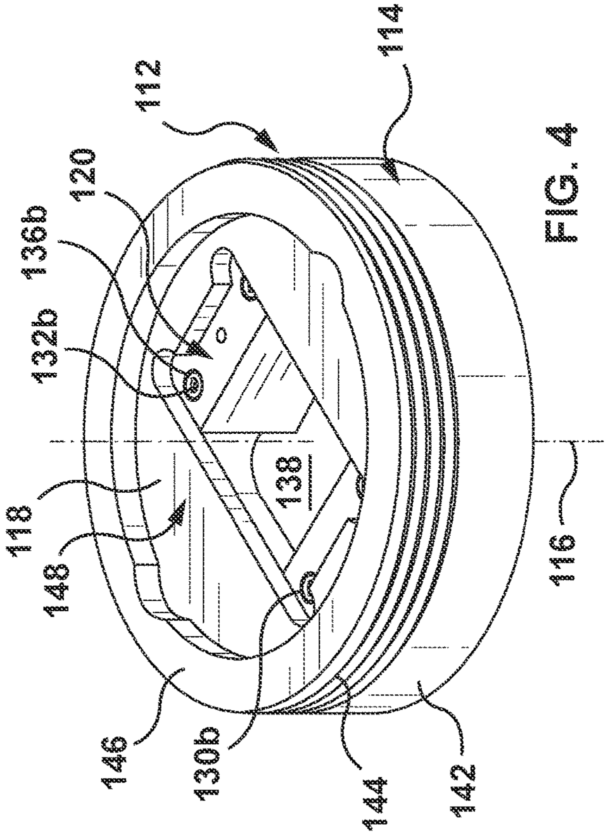
FIG. 4 is a perspective view of the base of the holder of FIG. 1.
Figure 14:
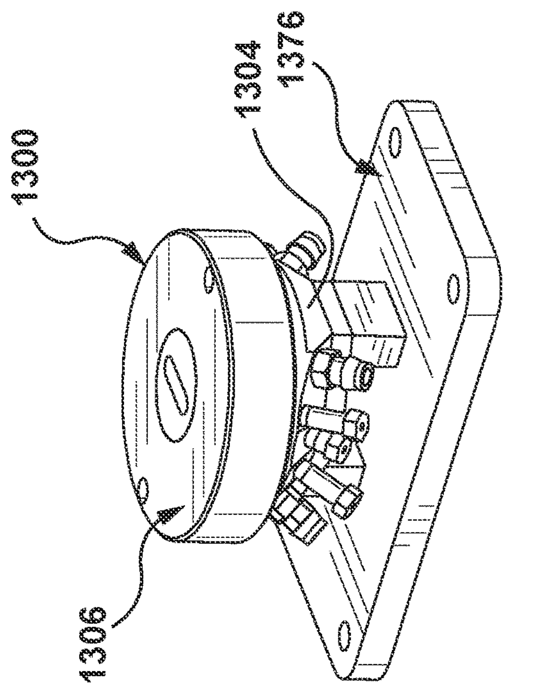
FIG. 14 is a perspective view of the holder, microfluidic chip, and support assembly of FIG. 13, in an assembled configuration.
Figure 13:
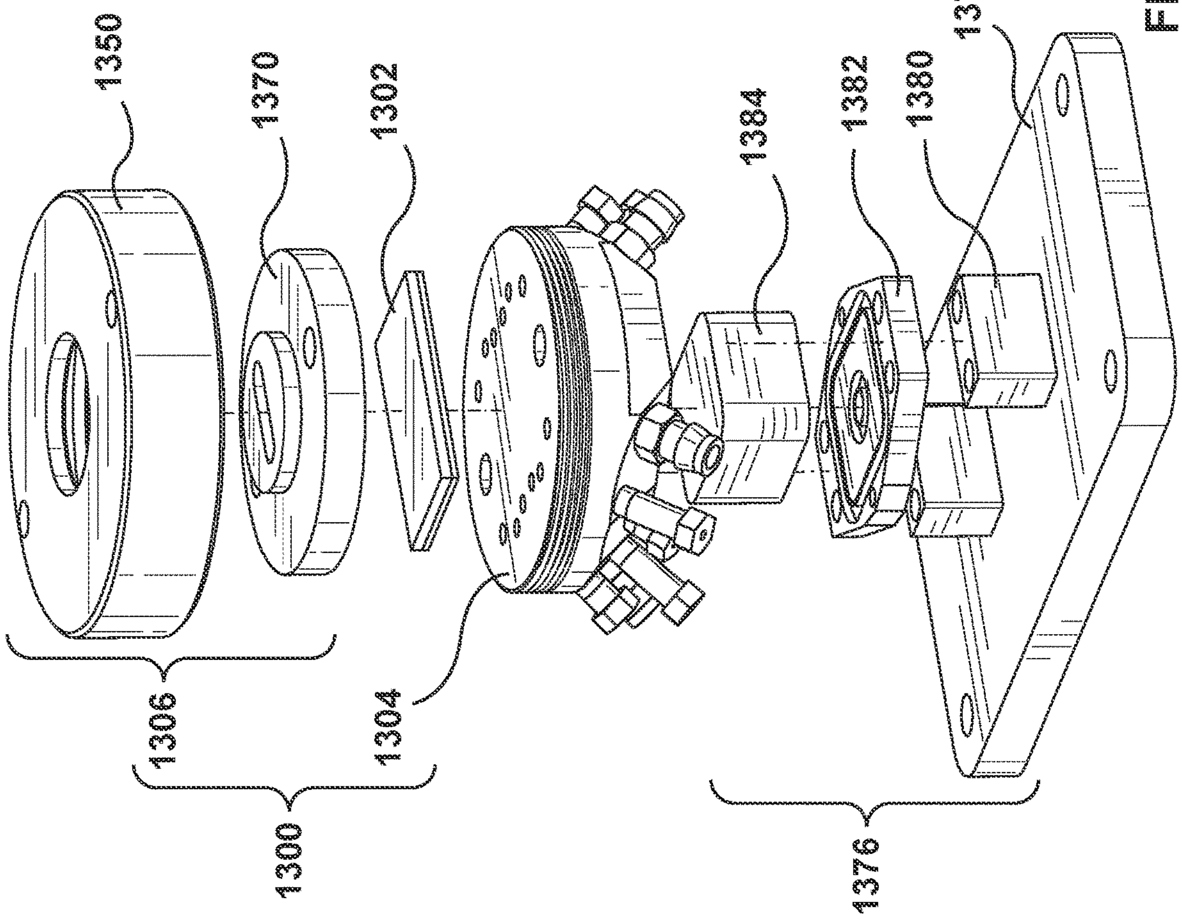
FIG. 13 is an exploded perspective view of another example holder for a microfluidic chip, also showing the microfluidic chip itself, as well as a support assembly.
Figure 16:
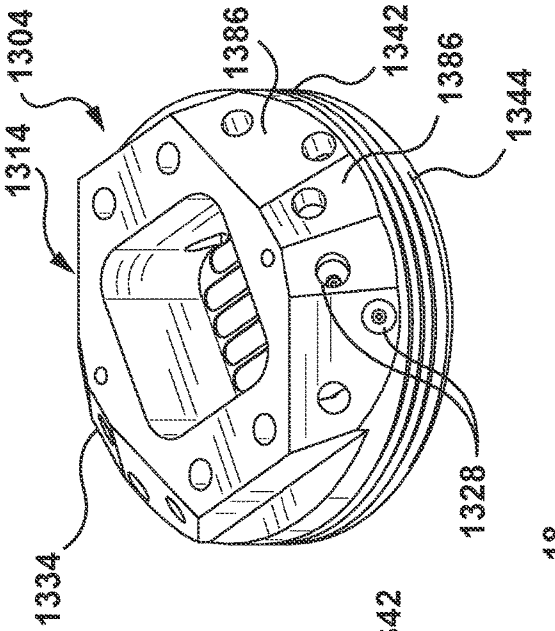
FIG. 16 is a bottom perspective view of the base of FIG. 15.
Figure 15:
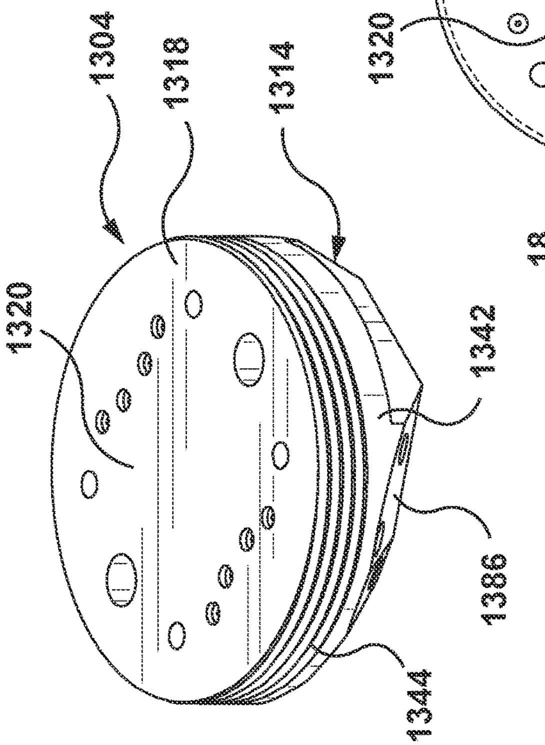
FIG. 15 is a top perspective view of a base of the holder of FIG. 13.
Figure 17:
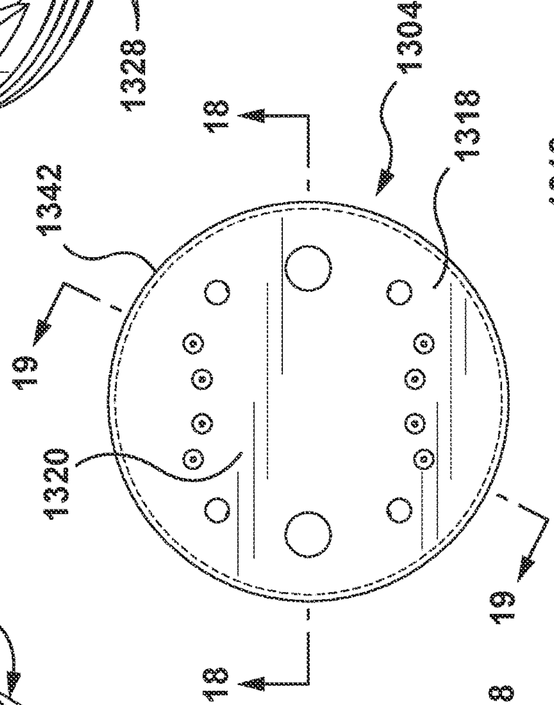
FIG. 17 is a top view of the base of FIG. 15.
Figure 19:
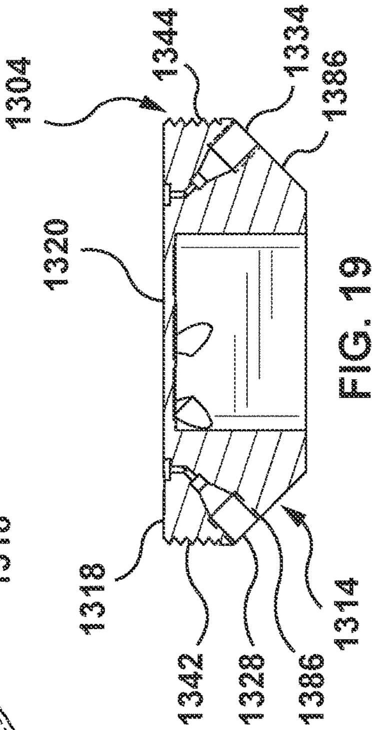
FIG. 19 is a cross-section taken along line 19-19 in FIG. 17.
Figure 18:
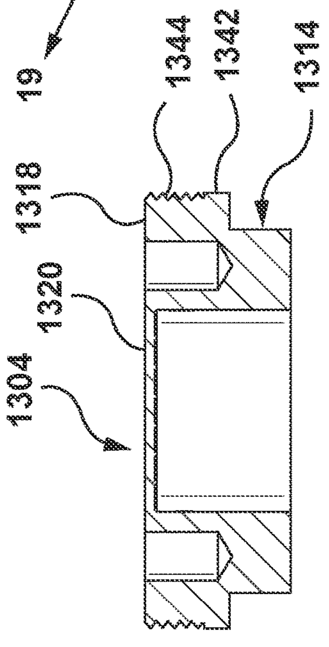
FIG. 18 is a cross-section taken along line 18-18 in FIG. 17.
Figure 21:
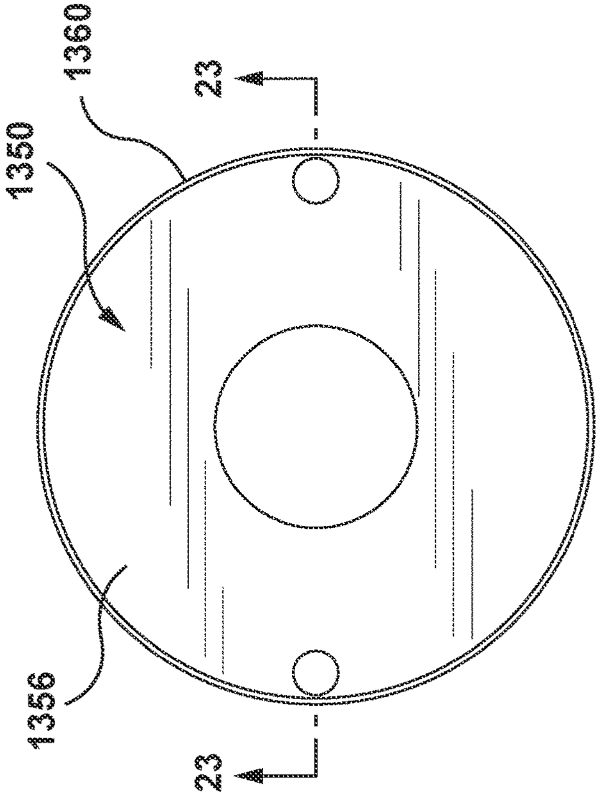
FIG. 21 is a top view of the ring of FIG. 20.
Figure 23:
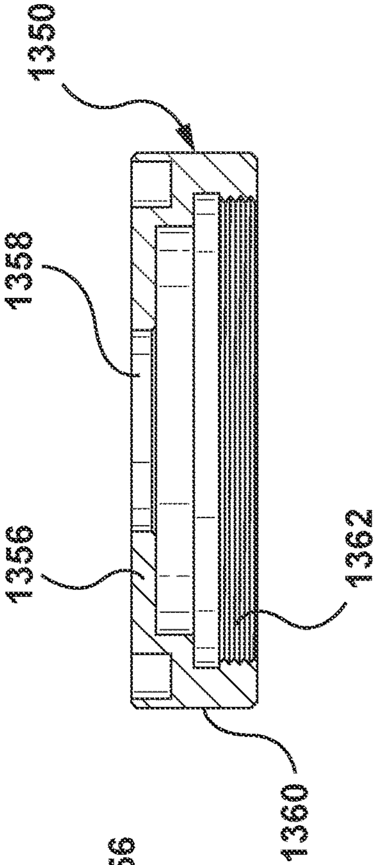
FIG. 23 is a cross section taken along line 23-23 in FIG. 21.
Figure 20:
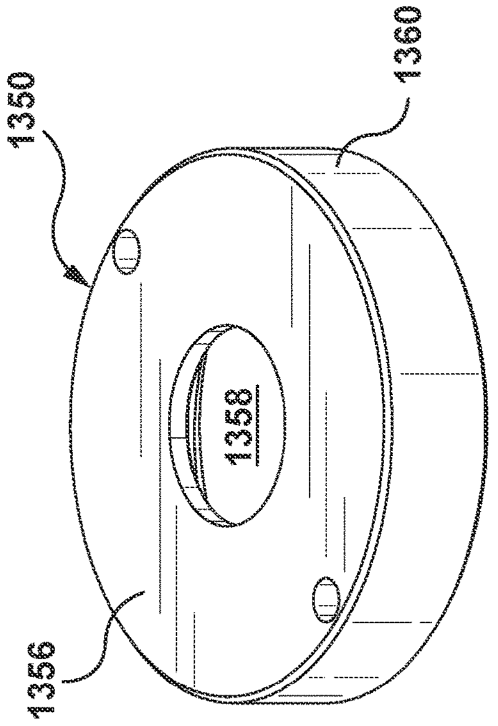
FIG. 20 is a top perspective view of a ring of the cover of the holder of FIG. 13.
Figure 22:
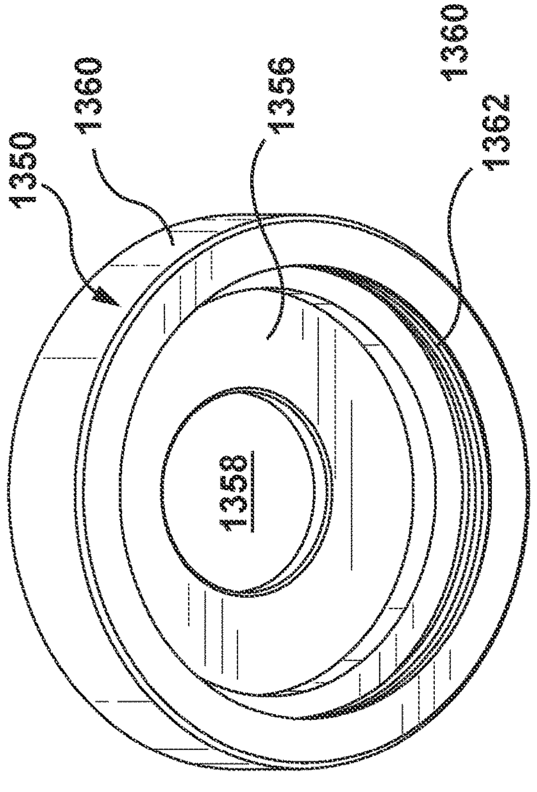
FIG. 22 is a bottom perspective view of the ring of FIG. 20.
Figure 25:
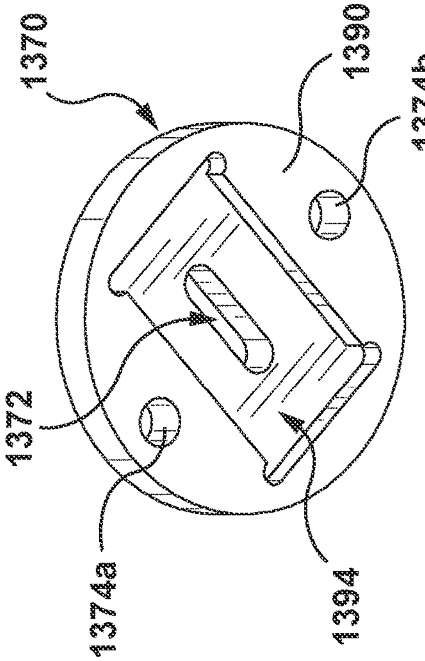
FIG. 25 is a bottom perspective view of the compression guide of FIG. 24.
Figure 28:
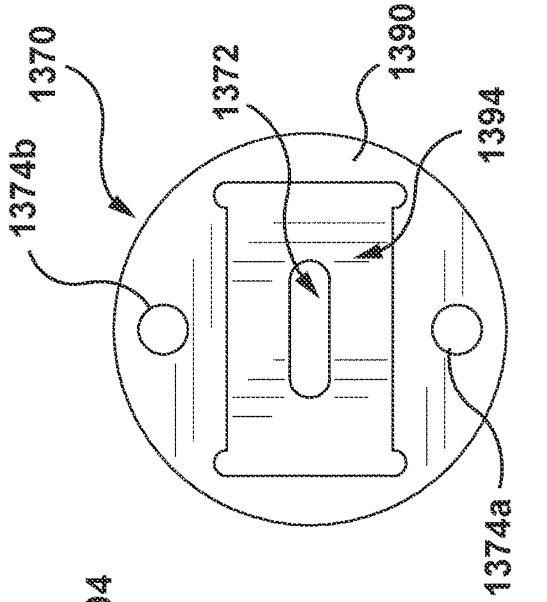
FIG. 28 is a bottom view of the compression guide of FIG. 24.
Figure 26:
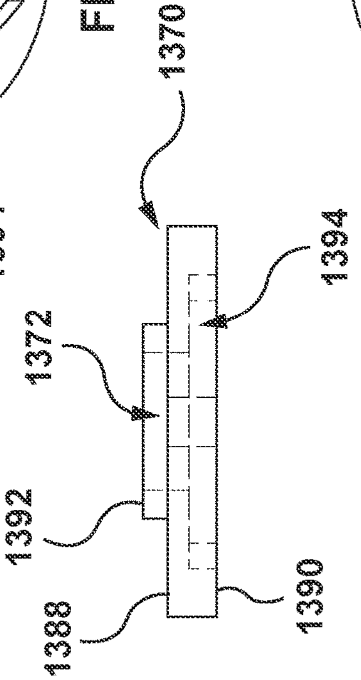
FIG. 26 is a side view of the compression guide of FIG. 24.
Figure 24:
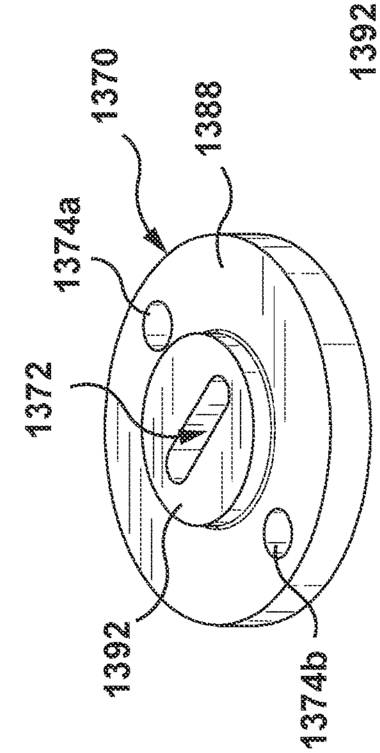
FIG. 24 is a top perspective of a compression guide of the cover of the holder of FIG. 13.
Figure 27:
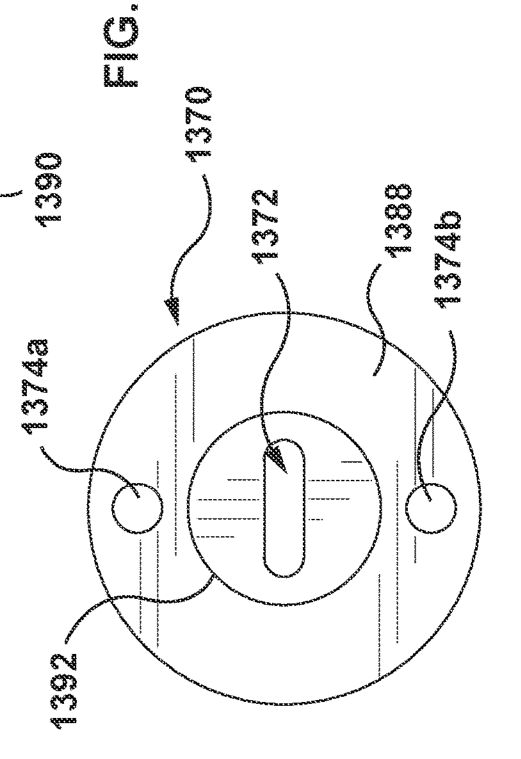
FIG. 27 is a top view of the compression guide of FIG. 24.

Referring to FIG. 7 in the example shown, the base further includes mounting holes 140 for connecting the holder to an analytical system (e.g. an analytical system including the support assembly 1376 shown in FIGS. 13 and 14).

Referring still to FIGS. 4 to 7, the base further includes a first circular wall 142, which extends around the seat 120. The first circular wall 142 is threaded—i.e. has a first screw thread 144 (shown most clearly in FIG. 4), which extends around the first circular wall 142. In the example shown, the first screw thread 144 is on an outer surface of the first circular wall 142. As will be described further below, the first screw thread 144 can engage with the cover 106 to securely mount the cover 106 to the base 104.

The phrase "extends around" as used herein with respect to the position of the first circular wall 142 and seat 120 indicates that when viewed from above (i.e. as shown in FIG. 5), the first circular wall 142 encircles the seat 120. Accordingly, while in the example shown, the first circular wall 142 extends vertically from a position below the seat 120 to a position above the seat 120, in alternative examples, the first circular wall can extend around the seat while being positioned entirely vertically below the seat or entirely vertically above the seat.

Referring still to FIGS. 4 to 7, in the example shown, the first circular wall 142 has an end surface 146, which is upwardly facing. The outward facing surface 118 is recessed from the end surface 146, to define a pocket 148 adjacent the outward facing surface 118 and within the first circular wall 142. As will be described further below, part of the cover 106 is receivable in the pocket 148.

The base 104 can be, for example, fabricated from a metal such as titanium.

Referring back to FIGS. 1 to 3, the cover 106 will now be described. In general, the cover 106 is mountable to the base 104 over the seat 120, by screwing the cover 106 to the base 104. In use, the cover 106 serves to retain the microfluidic chip 102 on the seat 120, while allowing analytical access to the microfluidic chip 102. In the example shown, the cover 106 includes three main parts: a ring 150, a transparent panel 152, and an annular gasket 154.

Figure 9:
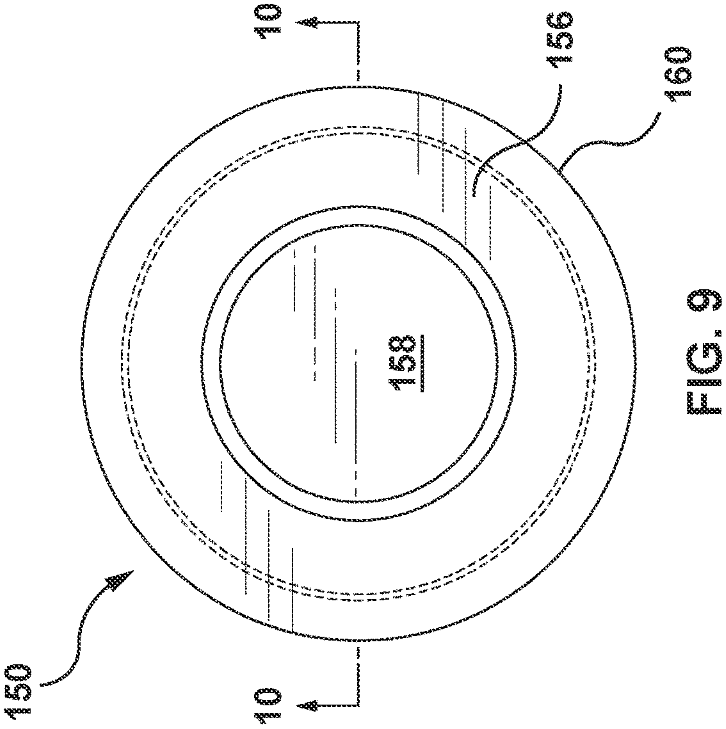
FIG. 9 is a top view of the ring of FIG. 8.
Figure 8:
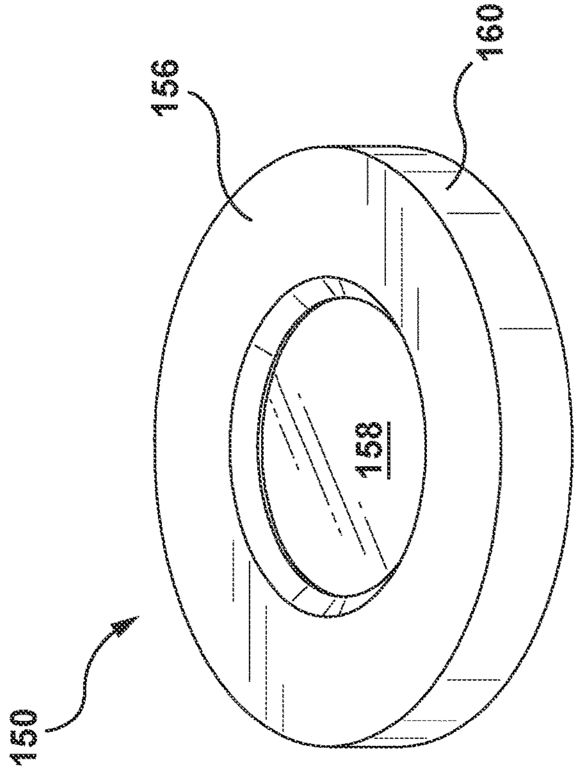
FIG. 8 is a perspective view of the ring of the holder of FIG. 1.
Figure 10:
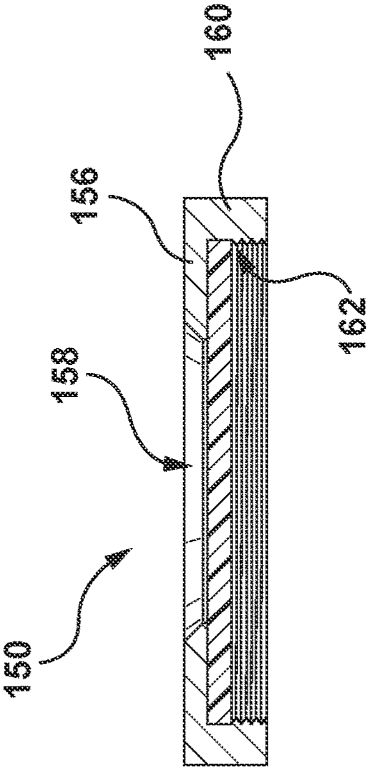
FIG. 10 is a cross-section taken along line 10-10 in FIG. 9.

Referring to FIGS. 8 to 10, the ring 150 includes an annular flange 156 defining a window 158, and a second circular wall 160 extending orthogonally from the annular flange 156, around the window 158. The second circular wall 160 is threaded—i.e. has a second screw thread 162 that extends around the second circular wall 160. In the example shown, the second screw thread 162 is on an inner surface of the second circular wall 160. As can be seen in FIGS. 1 to 3, the first circular wall 142 is nestable within the second circular wall 160, and the second screw thread 162 is engageable with the first screw thread 144 to screw the cover 106 to the base 104, with the window 158 overlying the seat 120.

Similarly to the first circular wall and the seat, the phrase "extends around" as used herein with respect to the position of the second circular wall 160 and the window 158 indicates that when viewed from above (i.e. as shown in FIG. 9), the second circular wall 160 encircles the seat window 158. Accordingly, while in the example shown, the second circular wall 160 extends vertically from a position aligned with the window 158 to a position below the window 158, in alternative examples, the second circular wall can be positioned entirely vertically below the window or entirely vertically above the window.

The ring 150 can be, for example, fabricated from a metal such as titanium.

Referring back to FIGS. 1 to 3, the transparent panel 152 is positionable over the seat 120 (shown in FIGS. 4 to 7), between the base 104 and the ring 150, and is receivable in the pocket 148 of the base. When the cover 106 is mounted to the base 104, the window 158 of the ring 150 overlies the panel 152, so that in use when the microfluidic chip 102 is received on the seat 120, the panel 152 and the window 158 together allow for analytical access (e.g. optical access, e.g. in order to carry out an optical investigation) to the microfluidic chip 102. In use, when the microfluidic chip 102 is received on the seat 120 and the cover 106 is screwed to the base 104, the annular flange 156 of the ring 150 bears against a periphery of the panel 152, and in turn, the panel 152 bears against the microfluidic chip 102, to force the microfluidic chip 102 against the o-rings 130*a*, 130*b*, 136*a*, 136*b*, and seal the fluid connection between the base 104 and the microfluidic chip 102.

In the example shown the transparent panel 152 is in the form of a disc. The transparent panel 152 can be, for example, a glass panel, a sapphire panel, a quartz panel, or a plastic panel.

Referring still to FIGS. 1 to 3, the annular gasket 154 is positionable between the annular flange 156 and the panel 152. The annular gasket 154 can be, for example, a graphite gasket. When the cover 106 is screwed to the base 104, the annular gasket 154 reduces friction between the annular flange 156 and the panel 152, to prevent, minimize, or reduce rotation of the panel 152. As such, in the example shown, the annular flange 156 of the ring 150 bears against the periphery of the panel 152 indirectly, via the annular gasket 154.

As mentioned above, in use, the panel 152 bears against the microfluidic chip 102, and the microfluidic chip 102 in turn bears against the base 104. In the example shown, the panel 152 bears against a majority of the cover-facing surface 110 of the microfluidic chip, and more specifically against the entire cover-facing surface 110 of the microfluidic chip 102. This allows for forces on the microfluidic chip 102 to be dissipated over the entire area of the cover-facing surface 110, which can prevent or minimize or reduce cracking or breaking of the microfluidic chip 102.

Referring to FIGS. 2 and 3, in some examples, in order to assemble the microfluidic chip 102 and holder 100, the microfluidic chip 102 can first be seated on the seat 120 of the base 104. The cover 106 can then be mounted to the base 104, over the microfluidic chip 102. More specifically, the panel 152 can be positioned over the microfluidic chip 102 by nesting it in the pocket 148 of the base 104, the annular gasket 154 can be positioned over the panel 152, and the ring 150 can be positioned over the annular gasket 154 and the panel 152, with the window 158 aligned with the microfluidic chip 102 and the flange 156 bearing against the periphery of the panel 152 via the annular gasket 154. The cover 106 can then be screwed to the base 104 by rotating the ring 150 with respect to the base 104, so that the first screw thread 144 engages the second screw thread 162.

As the ring 150 is rotated, the annular flange 156 bears against the periphery of the panel 152, which forces the panel 152 to bear against the microfluidic chip 102. As mentioned above, in the example shown, the panel 152 bears against the entire cover-facing 110 surface of the microfluidic chip 102. The microfluidic chip 102 in turn bears against the o-rings 130*a*, 130*b*, 136*a*, 136*b* of the seat 120, to seal the fluid connection between the base 104 and the microfluidic chip 102. Because the forces on the microfluidic chip 102 are borne over a large area of the microfluidic chip 102—i.e. over the entire cover-facing surface 110—the risk of cracking or breaking the microfluidic chip 102 during assembly to the holder 100 is minimized or reduced.

The microfluidic chip 102 and holder 100 can then be mounted in an analytic system (e.g. one including the support assembly 1376 of FIGS. 13 and 14), and a fluid can be directed into the microfluidic chip 102. Analysis can be conducted via the window 158—e.g. by viewing the microfluidic chip 102 with a microscope through the window 158 and the panel 152. Optionally, fluids can be directed through the microfluidic chip 102 at relatively high pressures, for example pressures of 320 bar or greater. Again, because the forces on the microfluidic chip 102 are borne over a large area of the microfluidic chip 102—i.e. over the entire cover-facing surface 110—the risk of cracking or breaking the microfluidic chip 102 with high pressure use is minimized or reduced.

Figure 11:
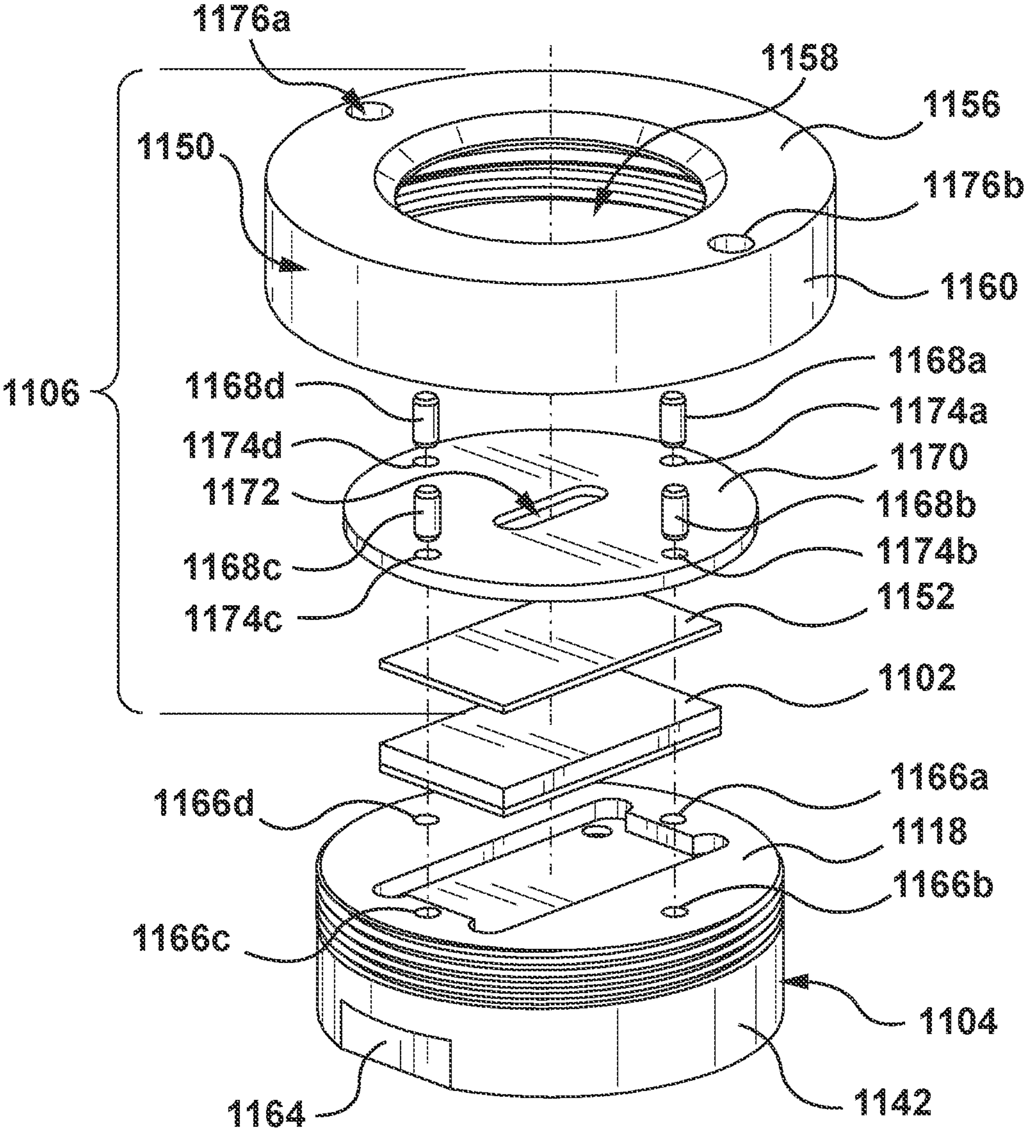
FIG. 11 is an exploded view of another example holder for a microfluidic chip, also showing the microfluidic chip itself.
Figure 12:
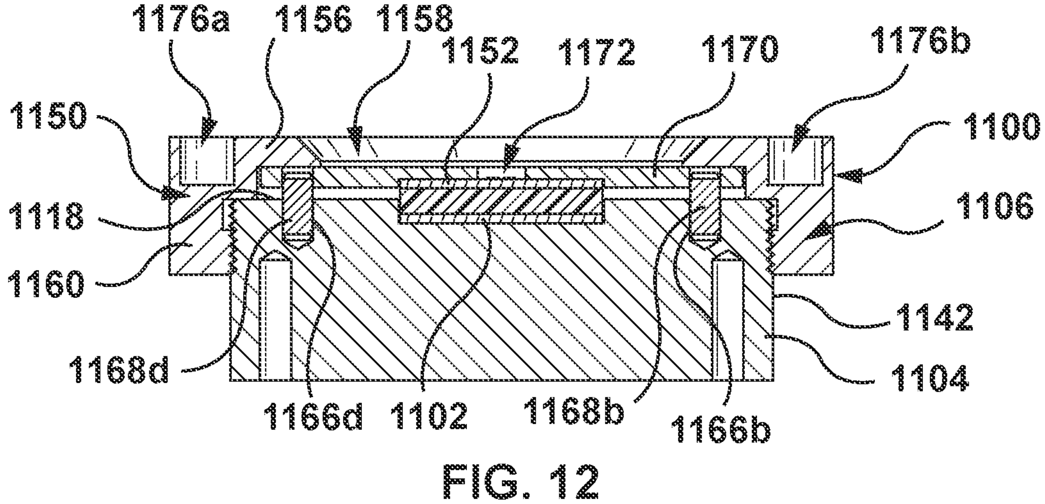
FIG. 12 is a cross section taken through the holder of FIG. 11 when assembled with the microfluidic chip.

Referring now to FIGS. 11 and 12, an alternative example of a holder 1100 for a microfluidic chip is shown. In FIGS. 11 and 12, features similar to those of FIGS. 1 to 10 are identified with the like reference numerals, incremented by 1000.

In the example of FIGS. 11 and 12, the base 1104 does not include a space for a heating apparatus. Furthermore, the first circular wall 1142 is notched to create a flat surface 1164 to allow a vice to grip the base 1104. In addition, the outward facing surface 1118 of the base 1104 includes four apertures 1166*a*-1166*d* for receiving pins 1168*a*-1168*d* of the cover 1106, which will be described in further detail below.

Referring still to FIGS. 11 and 12, in the example shown, the panel 1152 is rectangular in shape, and matches the shape of the microfluidic chip 1102.

Referring still to FIGS. 11 and 12, in the example shown, the cover 1106 includes a compression guide 1170, which is in the form of a disc that nests within the second circular wall 1160, and in use is sandwiched between the annular flange 1156 of the ring 1150 and the panel 1152. The compression guide 1170 includes an opening 1172 that in use is aligned with the window 1158 of the ring 1150, to allow for analytical access to the microfluidic chip 1102. The compression guide 1170 includes four through-holes 1174*a*-1174*d*. In use, the four through-holes 1174*a*-1174*d* align with the four apertures 1166*a*-1166*d* in the base 1104.

Referring still to FIGS. 11 and 12, in use, the pins 1168*a*-1168*d* of the cover 1106 are received in the through-holes 1174*a*-1174*d* of the compression guide 1170 and in the apertures 1166*a*-1166*d* of the base. In use, when the cover 1106 is screwed to the base 1104, the pins 1168*a*-1168*d* prevent the compression guide 1170 from rotating with respect to the base 1104, which in turn prevents the panel 1152 from rotating. This reduces the risk of scratching the microfluidic chip 1102. Furthermore, when the cover 1106 is screwed to the base 1104, the compression guide 1170 distributes forces across a majority of the panel 1152, which can reduce or prevent cracking or breaking of the panel 1152.

In the example of FIGS. 11 and 12, the ring 1150 is similar to the ring 150 of FIGS. 8 to 10; however, the flange 1156 includes a connector, in the form of apertures 1176*a* and 1176*b*, for engaging with a torque wrench (not shown). The torque wrench can be mounted to the apertures 1176*a* and 1176*b* and then used to screw the cover 106 to the base 104, optionally to a pre-selected tightness.

Referring now to FIGS. 13 to 28, another example of a holder 1300 for a microfluidic chip is shown. In FIGS. 13 to 28, features similar to those of FIGS. 1 to 10 are identified with the like reference numerals, incremented by 1200.

In FIGS. 13 and 14, the holder 1300 is shown with a support assembly 1376, which includes a mounting plate 1378, a standoff block 1380, a sealing plate 1382, and a heat exchange pillow 1384. The support assembly 1376 will not be described in detail herein. Furthermore, in alternative examples, the holder 1300 can be used with other support assemblies.

Referring still to FIG. 13, similarly to the holder 100 of FIGS. 1 to 10, the holder 1300 includes a base 1304 and a cover 1306, between which a microfluidic chip 1302 can be sandwiched.

The base 1304 is shown in greater detail in FIGS. 15 to 19. Similarly to the base 104, the base 1304 has an outward facing surface 1318 having a seat 1320, and a first circular wall 1342, which is threaded (i.e. includes screw threads 1344), extending around the seat. In the example shown, the seat 1320 is defined by a non-recessed portion of the outward facing surface 1318.

Referring still to FIGS. 15 to 19, the bottom portion 1314 of the base 1304 includes a plurality of inclined wall panels 1386 (only some of which are labelled), in which inlets 1328 and outlets 1334 (only some of which are labelled) of the fluid inflow channels and fluid outflow channels (not shown), respectively, are defined. Providing the inlets 1328 and outlets 1334 in inclined wall panels creates space in the base 1304 for the heat exchange pillow 1384 (shown in FIG. 13) while allowing for additional fluid inflow and outflow channels be included in the base 1304.

Referring to FIGS. 20 to 23, the cover 1306 includes a ring 1350, which is similar to the ring 1150 of FIGS. 11 and 12, and has an annular flange 1356 defining a window 1358, and a second circular wall 1360, which is threaded (i.e. with screw threads 1362), extending orthogonally from the annular flange 1356 and around the window 1358. Furthermore, referring to FIGS. 24 to 28, similarly to the cover 1106 of FIGS. 11 and 12, the cover 1306 includes a compression guide 1370, which is in the form of a disc and which includes an opening 1372 that is alignable with the window of the ring 1350; however, unlike the covers 106 and 1106 of FIGS. 1 to 12, the cover 1306 does not include a transparent panel. Instead, in use, the compression guide 1370 is positioned directly between the annular flange 1358 and the base 1304 and bears directly against the microfluidic chip 1302. More specifically, in the example shown, the compression guide includes a ring-facing surface 1388, and a chip-facing surface 1390. The ring-facing 1388 surface includes a boss 1392 in which the opening 1372 is defined and that fits in the window 1358 of the ring 1350. The chip-facing surface 1390 includes a pocket 1394. In use, the microfluidic chip 1302 can nest in the pocket 1394. Furthermore, similarly to the compression guide 1170, the compression guide 1370 includes through-holes 1374*a* and 1374*b*, through which pins (similar to those shown in FIG. 11) can be inserted to prevent rotation of the compression guide during screwing of the cover 1306 to the base 1304. As such, during assembly of the cover 1306 to the base 1304, the microfluidic chip 1302 is prevented from rotation and protected from scratching by the compression guide 1302.

In alternative examples, a transparent panel can be used with the holder of FIGS. 13 to 28.

In any of the above examples, the holder and chip can be sold or provided together or separately. Furthermore, the various parts of the holder can be sold or provided in an assembled configuration, or as a kit of parts to be assembled together.

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A microfluidic chip and holder assembly comprising:

a base having a seat and at least a first fluid channel that extends through the base, wherein the first fluid channel has an inlet that is spaced from the seat for connection to a fluid supply and an outlet that is in the seat;

a microfluidic chip received by the seat, wherein the microfluidic chip has a fluid pathway; and a cover mounted over the microfluidic chip to sandwich the microfluidic chip between the cover and the base, wherein the cover bears against the microfluidic chip to force the microfluidic chip to bear against the base and form a sealed connection between the outlet of the first fluid channel and the fluid pathway of the microfluidic chip.

2. The microfluidic chip and holder assembly of claim 1, wherein the base comprises an o-ring that surrounds the outlet, and wherein the microfluidic chip bears against the o-ring to form the sealed connection.

3. The microfluidic chip and holder assembly of claim 1, wherein the microfluidic chip comprises a base-facing surface and a cover-facing surface, and the cover bears against a majority of the cover-facing surface.

4. The microfluidic chip and holder assembly of claim 1, wherein the cover comprises a window that overlies the microfluidic chip to allow analytical access to the microfluidic chip.

5. The microfluidic chip and holder assembly of claim 4, wherein the cover comprises a transparent panel that bears against the microfluidic chip, and wherein the window overlies the panel.

6. The microfluidic chip and holder assembly of claim 1, wherein the cover is mounted over the microfluidic chip by screwing the cover to the base.

7. The microfluidic chip and holder assembly of claim 1, wherein the base comprises a space below the seat, and a heating/cooling apparatus is received in the space.

8. A kit of parts for a holder for a microfluidic chip, the kit of parts comprising:

a base having a seat against which a microfluidic chip is seatable, and at least a first fluid channel that extends through the base, wherein the first fluid channel has an inlet that is spaced from the seat for connection to a fluid supply, and an outlet that is in the seat for connection to a fluid pathway of the microfluidic chip;

a cover mountable over the seat, wherein the cover is configured to bear against the microfluidic chip when the microfluidic chip is seated against the seat to force the microfluidic chip to bear against the base and form a sealed connection between the outlet of the first fluid channel and the fluid pathway of the microfluidic chip.

9. The kit of parts of claim 8, wherein the base comprises an o-ring that surrounds the outlet to form the sealed connection.

10. The kit of parts of claim 8, wherein the cover is configured to bear against a majority of a cover-facing surface of the microfluidic chip.

11. The kit of parts of claim 8, wherein the cover comprises a window that overlies the seat.

12. The kit of parts of claim 11, wherein the cover comprises a transparent panel that is configured to bear against the microfluidic chip, and wherein the window overlies the panel.

13. The kit of parts of claim 8, wherein the cover is mountable over the seat by screwing the cover to the base.

14. The kit of parts of claim 8, wherein the base comprises a space below the seat, and a heating/cooling apparatus is received in the space.

15. The kit of parts of claim 13, wherein the cover comprises a compression guide that is prevented from rotating when the cover is screwed to the base.

16. The kit of parts of claim 8, wherein the cover comprises:

a ring that is mountable over the seat by screwing the ring to the base; and a compression guide that is positionable between the ring and the base, wherein the compression guide is non-rotatable with respect to the base when the ring is screwed to the base.

17. The kit of parts of claim 16, wherein the compression guide comprises at least one through hole, the base comprises at least one aperture alignable with the through hole, and the cover comprises at least one pin receivable in the through hole and the aperture.

18. The kit of parts of claim 16, wherein when a microfluidic chip is received on the seat and the cover is mounted to the base over the seat, the compression guide bears against the microfluidic chip.

19. The kit of parts of claim 8, wherein the base comprises at least a first inclined wall panel, wherein the inlet of the first fluid channel is defined in the first inclined wall panel.

20. The kit of parts of claim 8, wherein the base comprises a plurality of inclined wall panels.

* * * * *